Nov. 5, 1929.                J. SKAUG                 1,734,234
                            PIPE WRENCH
                         Filed July 9, 1927
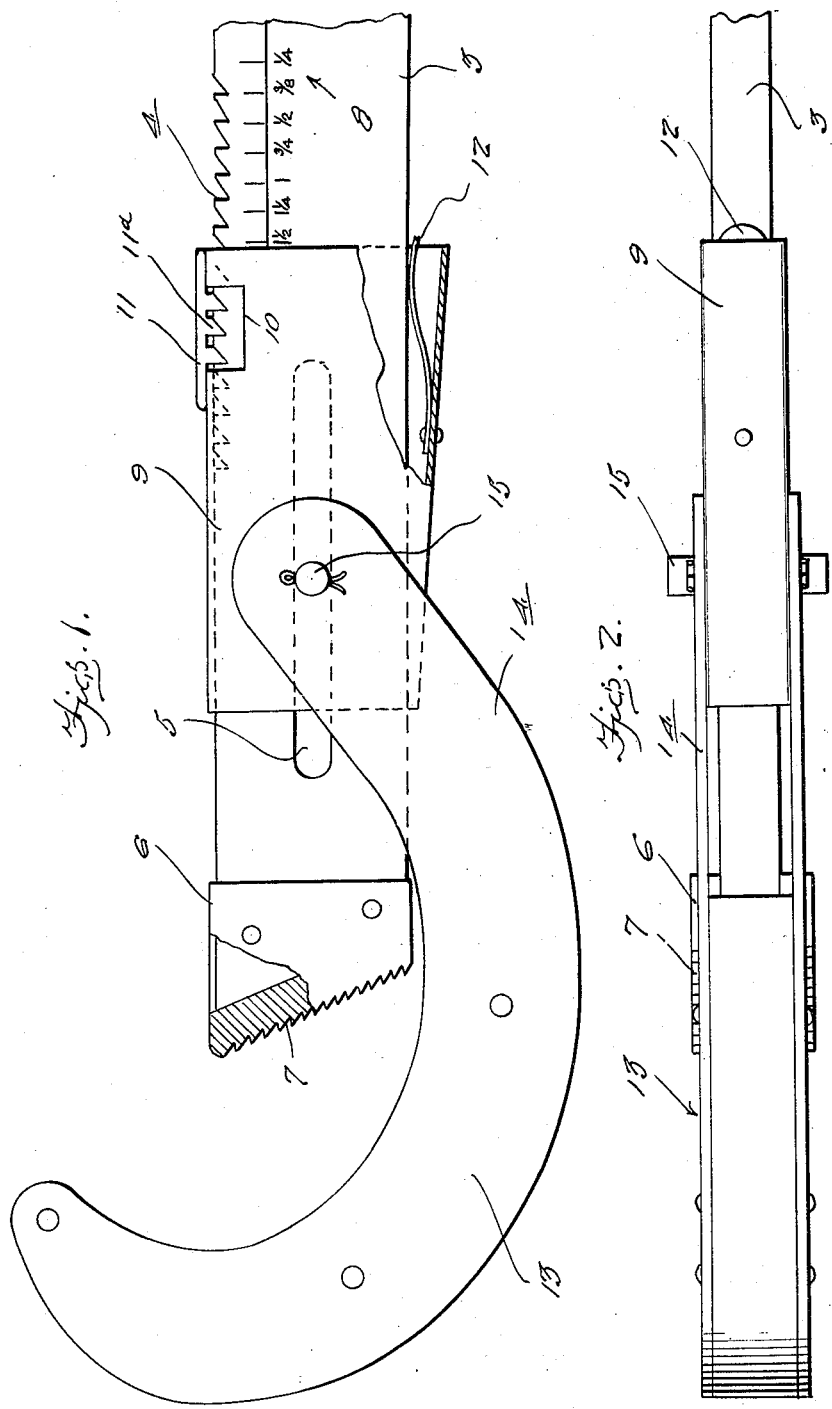
Inventor
Johan Skaug
By Clarence A O'Brien
                Attorney Patented Nov. 5, 1929

1,734,234

UNITED STATES PATENT OFFICE

JOHAN SKAUG, OF ROTHSAY, MINNESOTA

PIPE WRENCH

Application filed July 9, 1927. Serial No. 204,585.

This invention relates to an improved form of pipe wrench, and in carrying the invention into effect, I have attempted to generally improve upon tools of this class by providing one of comparative simplicity, which is accurate in adjustment, serviceable, and dependable, and appropriately designed for the purpose intended.

Briefly, the invention comprises a toothed shank at the outer end of which is a stationary pipe gripping jaw, a sleeve slidably mounted on the shank, and carrying a toothed member for cooperation with the teeth on the shank, and a swingably mounted relatively movable jaw.

The relative arrangement of parts upon which the patentable novelty is based, will become more readily apparent from the following description and drawings.

In the drawings:—

Figure 1 is a side view with portions broken away and shown in section of a wrench constructed in accordance with the present invention.

Fig. 2 is an edge view which may be described as a bottom plan, basing this statement on Fig. 1.

Referring now to the drawings by reference characters, it will be seen that the character 3 represents the shank. On one longitudinal edge adjacent the outer edge, the shank is formed with a multiplicity of teeth 4. Beyond the teeth it is formed with an elongated longitudinally extending slot 5. The extremity of the shank is beveled and a cap 6 is fitted over this beveled end and rigidly fastened thereto.

The cap is equipped with jaw teeth 7, these also being beveled or inclined with respect to the longitudinal axis of the shank. Cooperating with the aforesaid teeth 4 is a suitably graduated scale 8.

Slidably mounted on the shank is a metal sleeve 9 of general rectangular configuration. At one end, we find a notch 10. At this same end, a short bar 11 is arranged and this is equipped with three or more teeth $11^a$ for cooperation with the aforesaid teeth 4. The teeth $11^a$ are exposed by the notch so that the operator may see when they are properly engaged in the teeth 4. Disposed within the sleeve and on a side opposite to the bar 11 is a flat spring 12 which engages an adjacent face of the shank and serves to maintain the teeth $11^a$ in yieldable engagement with the teeth 4.

The sleeve 9 provides a means for slidably mounting the relatively movable jaw 13 on the shank. The jaw 13 is of any suitable construction, being of general J-shaped configuration including spaced parallel arms 14 which straddle the shank and sleeve and which are connected to the sleeve through the medium of a coupling pin 15. Incidentally, this pin extends through the slot 5 and permits a pivotal swinging movement of the jaw 13.

From the foregoing it is obvious that one end of the sleeve functions as a gauge for cooperation with the graduations of the scale 8, and obviously by pressing against that side of the sleeve carrying the springs 12, the teeth $11^a$ are permitted to ratchet over the teeth 4, to permit the sleeve to be adjusted to the desired position.

Having regulated the jaws 11 and 13, the pipe is spaced therebetween in a customary manner to permit the tool to be operated for turning the pipe.

The simplicity of the device is such that it permits a clear understanding of the construction and operation to be had, after reading the foregoing description in connection with the drawings. Therefore, a more lengthy description is thought unnecessary.

Having thus described my invention, what I claim as new is:—

A wrench structure comprising a shank provided with a jaw at one end thereof, one edge of the shank being toothed and having a longitudinal slot adjacent the jaw end, a sleeve slidably disposed on the shank over the slotted and toothed portions thereof, a pivotal jaw, a pin for pivotally connecting the jaw to the sleeve, said pin being disposed through the longitudinal slot, the said sleeve being formed with an opening in one edge portion thereof extending a substantial distance down opposite sides thereof, a toothed bar rigidly secured to the sleeve over said opening, the teeth of the said bar being adapted for engagement with the teeth of the shank, and a spring interposed between the sleeve and the shank for maintaining the teeth of the bar and the teeth of the shank engaged.

In testimony whereof I affix my signature.

JOHAN SKAUG.